Figure 1:
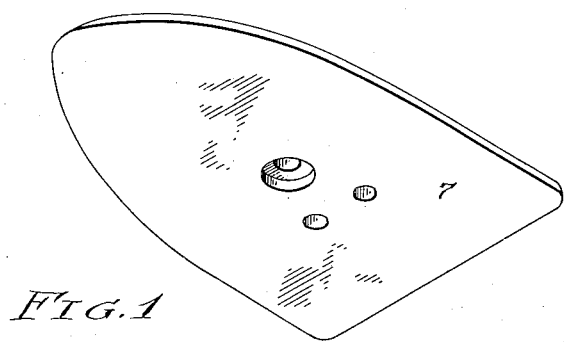

E. L. WIEGAND.
ELECTRICAL HEATING DEVICE.
APPLICATION FILED SEPT. 24, 1914.

1,154,953.

Patented Sept. 28, 1915.

WITNESSES:
R. L. Bruck.
H. B. McGill.

INVENTOR,
Edwin L. Wiegand
BY Hull & Smith
ATTYS.

UNITED STATES PATENT OFFICE.

EDWIN L. WIEGAND, OF YOUNGSTOWN, OHIO.

ELECTRICAL HEATING DEVICE.

1,154,953.  Specification of Letters Patent.  Patented Sept. 28, 1915.

Application filed September 24, 1914. Serial No. 863,302.

*To all whom it may concern:*

Be it known that I, EDWIN L. WIEGAND, a citizen of the United States, residing at Youngstown, in the county of Mahoning and State of Ohio, have invented a certain new and useful Improvement in Electrical Heating Devices, of which the following is a full, clear, and exact description, reference being had to the accompanying drawings.

This invention relates to electrical heating devices and has for its general purpose the provision of a device of this character that can be produced in a cheap and efficient manner and which shall be shielded against mechanical injury or the entrance of moisture.

Figure 3:
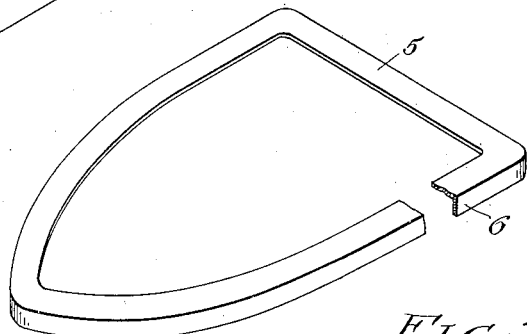
Figure 2:
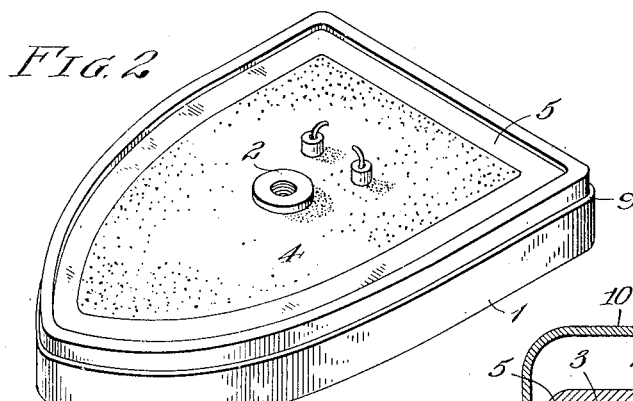
Figure 4:
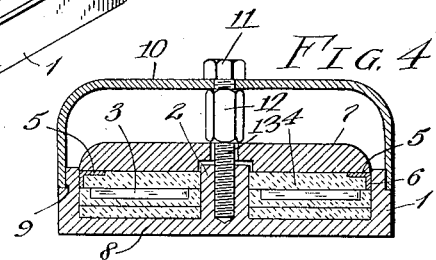

Generally speaking the invention may be defined as consisting of the combinations and constructions recited in the claims hereto annexed and illustrated in the drawings accompanying and forming a part hereof, wherein:

Figure 1 is a bottom perspective view of the cover of the heating element; Fig. 2 is a perspective view of the heating element itself with its cover removed; Fig. 3 is a perspective view of an edge retaining or border ring employed with said heating element; and Fig. 4 is a transverse, cross-sectional view through the complete heating device.

Describing the parts by reference characters, 1 represents the casing or shell of the heating element, a sad iron being here chosen for purposes of illustration. This consists of a metal shell of the proper shape and size and having suitable securing provisions, in this case the boss 2. The resistance element consists of a wire or ribbon 3 submerged in a suitable cement composition shown at 4, which serves to support the wire and to convey its heat to the casing or shell 1. This cement is necessarily composed of substances highly resistant to the passage of current, rather conductive to heat, and not electrolytic or decomposable by electrical action. Inasmuch as any one of several substances can be used I do not confine myself to any although dried and pulverized bauxite with or without other materials, and moistened with water immediately before use serves excellently for the purposes in view. This composition is introduced into the shell or casing in the soft and plastic state and is compacted therein by pressure and forced into snug contact with the wire and shell, being thereafter burned or more or less vitrified at a high temperature. Before this compacting takes place a metallic border ring 5 is introduced into the shell or casing and pressed into the plastic material. This ring comprises a downturned portion 6 shaped to follow closely the inner wall of the shell or casing, whatever its form, and an overhanging or plate portion adapted to project over the cement as shown in Fig. 2, but preferably pressed in flush therewith.

The heating element is inclosed by a cover member 7 arranged to overlie the cement and the border ring and held in place by suitable means engaging the securing provisions of the shell. In the present embodiment the edge wall of the shell extends slightly above the surface of the cement and the cover 7 fits within the same, though this could be varied. Whatever the arrangement the ring prevents clipping disintegration at this point, and prevents the admission of steam, moisture, etc., at this point, while adding almost nothing to the cost of manufacture.

The flat face 8 of the shell forms the heating surface, and is, therefore, preferably left bare, regardless as to whether the device is to be used as a sad iron, a hot plate, a toaster, or for any other purpose. In order to provide an attractive finish and further to prevent deterioration of the interior, the walls of the shell 1 are preferably rabbeted as shown at 9 for the reception of the skirt portion of a shell 10. Numberless modes of securing this shell might be employed, the simplest I have conceived being to employ a screw 11 fitting into the recessed head 12 of the bolt 13 by which the cover 7 is secured in place.

It will be apparent that I have produced a device of extreme simplicity and cheapness, though changes in many details are intended to be claimed and secured herein.

Having thus described my invention, what I claim is:—

1. In a device of the character described, the combination, with a metallic member having a bottom and walls, of a mass of vitrified, insulating material in said member and making close contact with said bottom and walls, a metallic border overlying and partially submerged in said material and following the contour of said walls, an electric conductor submerged in said material and forming a heating element, and a cover member secured over said material and fitting inside said walls.

2. In a device of the character described, the combination, with a metallic base member having walls, and a securing boss spaced from said walls, of a mass of vitrified electrically insulating material contained in said base between said boss and said walls, a metallic border overlying and partially submerged in said vitrified material and following the contour of said walls, an electric conductor submerged in said vitrified material, a cover member overlying said vitrified material and said border, and means securing said cover to said boss.

3. In a device of the character described, the combination, with a hollow metallic member having one side open and the remaining sides closed, of a mass of vitrified, electrically-non-conducting material in said member and making close mechanical contact with its interior, a conductor submerged in said material and supported, inclosed, and insulated thereby, a cover member removably applied to said first member, and a sheet metal edge ring partially submerged in said plastic material and breaking the joint between said members.

4. In a device of the character described, the combination, with a metallic base member having a heating face and walls projecting in the opposite direction from said heating face and defining a recess, an electric conductor in said recess and spaced from the boundaries thereof, electrically insulating, heat conducting material in said recess and surrounding said conductor, a cover for said base member, and a hollow shell adapted to fit against the top of said walls and to inclose said cover.

5. In a device of the character described, the combination, with a metallic base member having a heating face and walls projecting in the opposite direction from said heating face and defining a recess, the upper part of said walls being rabbeted, electrical heating devices in said recess, and a hollow shell adapted to embrace the rear part of said base member, said shell having a depending skirt adapted to be received in such rabbet.

6. In a device of the character described, the combination, with a metallic base member having walls and a securing boss spaced from said walls, of electric heating means supported in said base member between said boss and walls, a cover member adapted to overlie said heating means and engage the inner portion of said walls, securing devices adapted to engage said cover and boss whereby said cover may be held in place, a shell adapted to embrace said cover and having a depending skirt adapted to engage the outer portion of said walls, and means including said first securing devices for holding said shell in place.

In testimony whereof, I hereunto affix my signature in the presence of two witnesses.

EDWIN L. WIEGAND.

Witnesses:
JOSEPH SOLOMON,
CLINTON J. WALL.